(12) United States Patent
Riccio et al.

(10) Patent No.: US 10,125,235 B2
(45) Date of Patent: Nov. 13, 2018

(54) FORMULATED ISOCYANATE-REACTIVE BLENDS INCLUDING OLEFIN BASED BLOWING AGENT

(71) Applicant: Dow Global Technologies LLC, Midland, MI (US)

(72) Inventors: Rossella Riccio, Correggio (IT); Vanni Parenti, Campagnola (IT); Hans Kramer, Kempraten-Jona (CH); Melissa M. Rose, Marietta, GA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/107,501

(22) PCT Filed: Mar. 20, 2015

(86) PCT No.: PCT/US2015/021649
§ 371 (c)(1),
(2) Date: Jun. 23, 2016

(87) PCT Pub. No.: WO2015/143260
PCT Pub. Date: Sep. 24, 2015

(65) Prior Publication Data
US 2017/0002165 A1 Jan. 5, 2017

(30) Foreign Application Priority Data
Mar. 20, 2014 (IT) .............................. MI2014A0462

(51) Int. Cl.
| | |
|---|---|
| *C08J 9/14* | (2006.01) |
| *C08G 18/18* | (2006.01) |
| *C08G 18/08* | (2006.01) |
| *C08G 18/20* | (2006.01) |
| *C08G 18/22* | (2006.01) |
| *C08G 18/40* | (2006.01) |
| *C08G 18/48* | (2006.01) |
| *C08G 18/76* | (2006.01) |
| *C08G 101/00* | (2006.01) |

(52) U.S. Cl.
CPC .............. *C08J 9/144* (2013.01); *C08G 18/14* (2013.01); *C08G 18/18* (2013.01); *C08G 18/1808* (2013.01); *C08G 18/1816* (2013.01); *C08G 18/1825* (2013.01); *C08G 18/2036* (2013.01); *C08G 18/225* (2013.01); *C08G 18/4018* (2013.01); *C08G 18/4812* (2013.01); *C08G 18/7664* (2013.01); *C08G 2101/00* (2013.01); *C08G 2101/0025* (2013.01); *C08G 2101/0033* (2013.01); *C08J 2201/022* (2013.01); *C08J 2203/162* (2013.01); *C08J 2205/10* (2013.01); *C08J 2375/04* (2013.01); *C08J 2375/08* (2013.01)

(58) Field of Classification Search
CPC ................ C08G 18/14; C08G 18/1808; C08G 18/1816; C08G 18/1825; C08G 18/2036; C08G 18/225; C08G 18/4018; C08G 18/4812; C08G 18/7664; C08G 2101/0025; C08J 9/144; C08J 2203/162; C08J 2205/10; C08J 2375/08
See application file for complete search history.

(56) References Cited

U.S. PATENT DOCUMENTS

| | | | |
|---|---|---|---|
| 9,550,854 B2 | 1/2017 | Van Der Puy et al. | |
| 9,556,335 B2 | 1/2017 | Chen et al. | |
| 2004/0256594 A1 | 12/2004 | Singh et al. | |
| 2009/0099273 A1 | 4/2009 | Williams et al. | |
| 2009/0099274 A1 | 4/2009 | Van Der Puy et al. | |
| 2011/0039964 A1 | 2/2011 | Wiliams et al. | |
| 2012/0004334 A1* | 1/2012 | Kramer .............. | C08G 18/4018 521/88 |
| 2012/0104307 A1 | 5/2012 | Bogdan et al. | |
| 2012/0248371 A1* | 10/2012 | Ross ........................ | C08J 9/146 252/182.15 |
| 2013/0041048 A1 | 2/2013 | Chen et al. | |
| 2013/0161554 A1 | 6/2013 | Elsheikh et al. | |
| 2013/0210946 A1 | 8/2013 | Ling et al. | |
| 2014/0005288 A1 | 1/2014 | Chen et al. | |
| 2014/0213677 A1 | 7/2014 | Jimenez et al. | |
| 2014/0364528 A1 | 12/2014 | Rexrode et al. | |
| 2015/0322225 A1 | 11/2015 | Williams et al. | |
| 2017/0002165 A1 | 1/2017 | Riccio et al. | |

FOREIGN PATENT DOCUMENTS

EP 2277969 A3 10/2012

OTHER PUBLICATIONS

PCT/US2015/021649, International Search Report and Written Opinion dated May 29, 2015.
PCT/US2015/021649, International Preliminary Report on Patentability dated Sep. 20, 2015.

*Primary Examiner* — John M Cooney

(57) ABSTRACT

A storage stable isocyanate-reactive composition has ethylene oxide content from 1 wt % to 50 wt %, based on the total weight of an isocyanate-reactive component that includes a polyol component, a catalyst component, and a blowing agent component. The polyol component includes at least one polyol, the catalyst component includes at least one amine catalyst, and the blowing agent component includes at least one hydrohaloolefin based blowing agent. The isocyanate-reactive component is storable at least at one of room temperature and a higher temperature for a period of at least 1 day with a less than 10 second change in gel time when reacted with an isocyanate component at an isocyanate index from 100 to 150, compared to when the same isocyanate-reactive component is stored for a period of less than 1 day at room temperature and reacted with the same isocyanate component at the same isocyanate index from 100 to 150.

14 Claims, No Drawings

FORMULATED ISOCYANATE-REACTIVE BLENDS INCLUDING OLEFIN BASED BLOWING AGENT

FIELD

Embodiments relate to storage stable formulated polyol blends including an olefin based blowing agent, methods of producing the storable stable formulated polyol blends including an olefin based blowing agent, polyurethanes (such as rigid foams) derived from the storage stable formulated polyol blends, and methods of producing polyurethanes using the storage stable formulated polyol blend.

INTRODUCTION

Rigid foams, e.g., polyurethane and/or polyisocyanurate foams are used in various industries such as appliance manufacturing and construction. Rigid foams may have thermal insulation properties, fire resistance properties, and/or structural properties within specified density ranges. As discussed in US Patent Publication No. 2004/0256594, historically cholorofluorocarbon (CFC) and hydrochlorofluorocarbon (HCFC) based blowing agents have been used to produce rigid foams; however, due to environmental concerns alternatives are sought. The use of hydrohaloolefin based blowing agents has been proposed, but as discussed in International Publication No. WO 2009/048807, there are concerns with respect to storage stability of the formulated isocyanate-reactive blends when polyols, amine based catalysts, and olefins are included therein. In particular, when a foam is produced by reacting an isocyanate component with a formulated isocyanate-reactive blend, instability in the formulated blend could lead to lower quality foams or foam failure.

For example, as discussed in International Publication No. WO 2009/048807, the instability may be based on the reaction of certain amine catalysts with the hydrohaloolefin based blowing agents, which essentially may inactivate the amine catalyst. It is proposed in International Publication No. WO 2009/048807 to use specific sterically hindered amine based catalysts in place of customarily used amine catalysts; however, this is a restrictive option that may increase the overall cost (e.g., cost of components and/or manufacturing costs) associated with producing the rigid foam and/or may not be commercially viable. Accordingly, alternatives to using sterically hindered amine catalyst to form storage stable formulated isocyanate-reactive blends that include at least a polyol component, an amine catalyst, and an olefin (e.g., hydrohaloolefin) based blowing agent, are sought.

SUMMARY

Embodiments may be realized by providing a storage stable isocyanate-reactive composition that has a total ethylene oxide content from 1 wt % to 50 wt %, based on the total weight of an isocyanate-reactive component that includes a polyol component, a catalyst component, and a blowing agent component. The polyol component includes at least one polyol, the catalyst component includes at least one amine catalyst, and the blowing agent component includes at least one hydrohaloolefin based blowing agent. The isocyanate-reactive component is storable at least at one of room temperature and a higher temperature for a period of at least 1 day with a less than 10 second change in gel time when reacted with an isocyanate component at an isocyanate index from 100 to 150, compared to when the same isocyanate-reactive component is stored for a period of less than 1 day at room temperature and reacted with the same isocyanate component at the same isocyanate index from 100 to 150.

DETAILED DESCRIPTION

Polyurethane polymers (e.g., that are used to form polyurethane based products such as rigid foams, flexible foams, viscoelastic foams, elastomers, etc.) contain urethane moieties and are made by starting materials that include an isocyanate component and an isocyanate-reactive component. The isocyanate component includes one or more polyisocyanates, one or more isocyanate-terminated prepolymer derived from one or more polyisocyanates, and/or one or more quasi-prepolymers derived from one or more polyisocyanates, as would be understood by a person of ordinary skill in the art. The isocyanate-reactive component includes a polyol component (e.g., that includes one or more polyols), a catalyst component (e.g., that includes one or more amine catalysts), and a blowing agent component (e.g., that includes one or more olefin based blowing agents and/or a hydrohaloolefin). A reaction mixture for forming the polyurethane polymers may optionally include water, e.g., as an additive or as part of the blowing agent component (e.g., the water may be added as part of the isocyanate-reactive component). The reaction mixture for forming the polyurethane polymers may include an optional additive component that includes one or more optional additives (e.g., a curative agent, a chain extender, a filler, a stabilizer, a surfactant, and/or other additives that modify properties of the resultant final product). The optional additive component may be separate (e.g., separately provided) from the isocyanate component and the isocyanate-reactive component.

The isocyanate-reactive component may be entirely or in part pre-blended before mixing with the isocyanate component (i.e., may be mixed before reacting with the isocyanate component). In embodiments, at least the polyol component, the catalyst component, and the blowing agent component are pre-blended, e.g., for ease of manufacturing. As such, compatibility with the isocyanate-reactive component is important, e.g., compatibility between the polyol component and the catalyst component, compatibility between the polyol component and the blowing agent component, and/or compatibility between the catalyst component and the blowing agent component.

For example, compatibility between the catalyst component and the blowing agent component and/or the polyol component may have an effect on the resultant polyurethane products. By way of an example, since catalyst assisted polymerization occurs when forming a final polyurethane product (such as a rigid foam), if the catalyst is not able to assist in polymerization, the polymerization may not be complete and/or may take too long so as not to be commercially feasible. An incomplete polymerization may produce a low molecular weight polymer and/or leave unreacted isocyanate groups, which may lead to crosslinking by thermally induced reactions and/or reaction with water (or bubble formation leading to defects in an elastomer, adhesive, sealant, etc.). A slow polymerization may lead to a process that is commercially infeasible and/or an inferior product. Accordingly, embodiments relate to the use of a storage stable isocyanate-reactive component that allows for improved compatibility within the starting materials.

For example, by storage stable isocyanate-reactive component it is meant the isocyanate-reactive component is storable at least at one of room temperature and a higher temperature for a period of at least 1 day with a less than 10 second change in gel time when reacted with an isocyanate component at an isocyanate index from 100 to 150, compared to when the same isocyanate-reactive component is stored for a period of less than 1 day at room temperature and reacted with the same isocyanate component at the same isocyanate index from 100 to 150. In other words, by storage stable it is meant that there is a less than 10 second change in gel time when a same isocyanate-reactive component before any such storage is reacted with a same isocyanate component at a same isocyanate index within the range of 100 to 150.

For example, by storage stable isocyanate-reactive component it may be meant that the component is be storable at room temperature and/or a higher temperature (such as from 35° C. to 80° C., from 35° C. to 60° C., from 39° C. to 51° C., from 40° C. to 50° C., at 40° C., at 50° C., etc.) for a period of at least 10 days (e.g., from 1 day to 10 days, from 1 day to 14 days, from 1 day to 49 days, from 1 days to 50 days, from 1 days to 100 days, etc.) without a substantial change (i.e., less than 10 seconds) in gel time when the storage stable isocyanate-reactive component is reacted with an isocyanate component (e.g., at room temperature of 21±2° C.) to form a polyurethane product. According to exemplary embodiments, the storage stable isocyanate-reactive component is storable at room temperature, a higher temperature of 40° C., and/or a higher temperature of 50° C. for a period of at least 10 days with no more than 6 seconds in gel time when reacted with the isocyanate component at room temperature. For example, the isocyanate-reactive component is storable at 50° C. for a period of from 1 day to 14 days with a less than 6 second change in gel time when reacted with the isocyanate component at the isocyanate index from 100 to 150, compared to when the same isocyanate-reactive component is stored for the period of less than 1 day at room temperature and reacted with the same isocyanate component at the same isocyanate index from 100 to 150.

Further, embodiments relate to polyurethane products that may be formed at a low cost, e.g., with respect to components such as the catalyst component and/or processing costs. Accordingly, the use of the storage stable isocyanate-reactive component may reduce the cost and/or time involved in manufacturing polyurethane products such as rigid polyurethane foams.

According to embodiments, the storage stable isocyanate-reactive component has a total ethylene oxide content from 1 wt % to 50 wt %, based on the total weight of the isocyanate-reactive component, which total weight includes the polyol component, the catalyst component, the blowing agent component. The total weight may include at least one optional additive component (for example, if included, the optional additive component may include a silicone surfactant having an ethylene oxide content that contributes to the overall ethylene oxide content of the isocyanate-reactive component). For example, the total ethylene oxide content may be from 1 wt % to 40 wt %, from 1.5 wt % to 35 wt %, 4 wt % to 30 wt %, 8 wt % to 25 wt %, 10 wt % to 20 wt %, etc.

Polyol Component

The isocyanate-reactive component includes a polyol component. The polyol component could include only one polyol (such as a first polyether polyol) or more than one different polyols (such as, by way of example, various combinations of the first polyether polyol, a second polyether polyol that is different from the first polyether polyol, a first polyester polyol, a second polyester polyol that is different from the first polyester polyol, a first hybrid polyester-polyether polyol, a first simple polyol, a second simple polyol that is different from the first simple polyol, etc.). The polyol component may include ethylene oxide, propylene oxide, and/or butylene oxide. According to exemplary embodiments, the amount of the polyol component in the isocyanate-reactive component is from 45 wt % to 85 wt % (e.g., 50 wt % to 80 wt %, 55 wt % to 75 wt %, 60 wt % to 75 wt %, 65 wt % to 72 wt %, etc.). One or more of the polyols in the polyol component may contribute to the overall ethylene oxide content of isocyanate-reactive component. According to an exemplary embodiment, at least one polyol in the polyol component excludes any ethylene oxide.

The polyol component may include at least one low nominal hydroxyl functionality (e.g., a diol or triol) and low number average molecular weight (e.g., less than 1500 g/mol, less than 1300 g/mol, less than 1200 g/mol, from 500 g/mol to 1200 g/mol, 500 g/mol to 800 g/mol, 900 g/mol to 1100 g/mol, etc.) polyether polyol. For example, the low functionality and low molecular weight polyol may be an alcohol initiated polyether polyol such as a glycerine initiated propylene oxide and/or ethylene oxide based polyether polyol (such as a glycerine initiated propoxylated polyether polyol, a glycerine initiated all ethylene oxide feed polyol, and/or a glycerine initiated propylene oxide and ethylene oxide feed polyether polyol,). If included, the total amount of low functionality and low molecular weight polyol may account for 1 wt % to 20 wt % of the total weight of the isocyanate-reactive component.

The polyol component may include at least one high nominal hydroxyl functionality (e.g., 4.0 and greater) and low number average molecular weight (e.g., less than 1500 g/mol, less than 1200 g/mol, less than 1000 g/mol, from 500 g/mole to 1000 g/mol, etc.) polyether polyol. For example, the high functionality and low molecular weight polyol may be an alcohol initiated polyether polyol such as a sucrose/glycerine initiated propylene oxide and/or ethylene oxide based polyether polyol and/or a sorbitol initiated propylene oxide and/or ethylene oxide based polyether polyol (such as a sucrose/glycerine initiated propoxylated polyether polyol and/or a sorbitol initiated propoxylated polyether polyol). If included, the total amount of high functionality and low molecular weight polyol may account for 10 wt % to 60 wt % of the total weight of the isocyanate-reactive component. The amount of the high functionality and low molecular weight polyol used may depend on whether the low functionality and low molecular weight polyol is included. For example, if the low functionality and low molecular weight polyol is included (e.g., in an amount from 1 wt % to 10 wt %), the high functionality and low molecular weight polyol may be used in the lesser amount (e.g., from 10 wt % to 30 wt %). If the low functionality and low molecular weight polyol is excluded, the high functionality and low molecular weight polyol may be used in the greater amount (e.g., from 30 wt % to 60 wt %).

The polyol component may include at least one amine initiated polyol, e.g., aromatic amine initiated polyether polyol. For example, the amine initiated polyol may have a nominal hydroxyl number from 250 mg KOH/g to 600 mg KOH/g, 350 mg KOH/g to 500 mg KOH/g, etc.). The amine initiated polyol may be based on propylene oxide and/or ethylene oxide. For example, the amine initiated polyol may be a toluenediamine initiated all propylene oxide feed polyol and/or a toluenediamine initiated propylene oxide and ethylene oxide feed polyol. If included, the total amount of amine initiated polyol may account for 20 wt % to 40 wt % and/or 20 wt % to 60 wt % of the total weight of the isocyanate-reactive component.

The polyol component may include at least one polyester polyol. For example, the polyester polyol may be a hybrid polyester-polyether polyol, e.g., as discussed in International Publication No. WO 2013/053555. If included, the hybrid polyester-polyether polyol may account for 5 wt % to 50 wt % (e.g., 10 wt % to 40 wt %, 15 wt % to 35 wt %, 20 wt % to 30 wt %, etc.) of the total weight of the isocyanate-reactive component. Accordingly to an exemplary embodiment, at least one hybrid polyester-polyether polyol may be included in an isocyanate-reactive component that is storage stable at higher temperatures such as 35° C. to 80° C. and/or 39° C. to 51° C.

The polyol component may include at least one low hydroxyl functionality (e.g., a diol or triol) polyester polyol. For example, the low functionality polyester polyol may be phthalic anhydride diethylene glycol polyester. If included, the low functionality polyester polyol may account for 5 wt % to 30 wt % of the total weight of the isocyanate-reactive component. According to exemplary embodiments, the isocyanate-reactive component that is storage stable at room temperature and/or higher temperatures may include one hybrid polyester-polyether polyol or one low functionality polyester polyol. For example, the low functionality polyester polyol may be included in isocyanate-reactive components that are storage stable at room temperature. For example, the hybrid polyester-polyether polyol may be included in isocyanate-reactive components that are storage stable at the higher temperatures.

The polyol component may include at least one simple polyol or simple amine. Exemplary simple polyols and simple amines include, e.g., glycerol, ethylene glycol, propane diol, diethylene glycol, dipropylene glycol, triethylene glycol, tripropylene glycol, cyclohexanedimethanol, methyl amine, ethyl amine glycerin, trimethylolpropane, trimethylolethane, pentaerythritol, erythritol, sucrose, sorbitol, mannitol, diethanolamine, monoethanolamine, triethanolamine, ethylene diamine, toluene diamine, and propane diamine. The simple polyol may contribute to the overall ethylene oxide content of the isocyanate-reactive component. If included, the simple polyol or simple amine may account for 0.5 wt % to 10 wt % of the total weight of the isocyanate-reactive component.

In exemplary embodiments, the polyol component includes an alcohol initiated polyether polyol, an aromatic amine initiated polyether polyol, and a polyester polyol. Each of the polyether polyol, the aromatic amine initiated polyether polyol, and the polyester polyol may contribute to the other ethylene oxide content in the isocyanate-reactive component. Said in another way, in exemplary embodiments, the ethylene oxide content source with respect to the polyols may be derived from at least three different polyols. For example, the alcohol initiated polyether polyol may be a low nominal hydroxyl functionality that is derived from both propylene oxide and ethylene oxide. The aromatic amine initiated polyether polyol may be derived from both propylene oxide and ethylene oxide. The polyester polyol may be the hybrid polyester-polyether polyol or the one low hydroxyl functionality polyester polyol. In addition, the polyol component may include at least one polyether or polyester polyol that does not have an EO content, e.g., polyoxypropylene polyols.

In an exemplary embodiment, polyol component of the isocyanate-reactive component includes: (i) from 1 wt % to 20 wt % (e.g., 1 wt % to 15 w %, 1 wt % to 10 wt %, 5 wt % to 10 wt %, etc.) of an alcohol initiated low nominal hydroxyl functionality and low number average molecular weight polyether polyol that is derived from both propylene oxide and ethylene oxide; (ii) from 10 wt % to 30 wt % (e.g., 15 wt % to 30 wt %, 20 wt % to 30 wt %, etc.) of an alcohol initiated the high hydroxyl functionality and low number average molecular weight polyether polyol that is derived from propylene oxide and not derived from ethylene oxide; (iii) from 20 wt % to 40 wt % (e.g., 25 wt % to 40 wt %, 30 wt % to 40 wt %, etc.) of the aromatic amine initiated polyether polyol that is derived from both propylene oxide and ethylene oxide; and (iv) from for 5 wt % to 30 wt % (e.g., 5 wt % to 25 wt %, 5 wt % to 20 wt %, 10 wt % to 20 wt %, etc.) of the low hydroxyl functionality polyester polyol that is derived from at least ethylene oxide. Accordingly, each (i), (iii), and (iv) contribute to the overall EO content in the isocyanate-reactive composition.

Catalyst Component

The catalyst component may include at least one catalyst. For example, the catalyst component includes at least one amine based catalyst. The total amount of amine based catalyst in the isocyanate-reactive component may be from 0.5 wt % to 10 wt % based on the total weight of the isocyanate-reactive component. The amine based catalyst may be a diamine catalyst, a tertiary amine catalyst, and/or a trimerization catalyst that includes an amine. The amine based catalyst may not be sterically hindered in contrast to the discussion International Publication No. WO 2009/048807. For example, the amine based catalyst be may have a diamine or triamine terminated chemical structure. Exemplary catalysts include a toluene based diamine or triamine, a phenyl based diamine or triamine, an alkyl based dianiline, an alkyl based tramine, a polyether based diamine, an isophorone based diamine, and a propylene based triamine. For example, the catalyst component may include various combinations of pentamethyldiethylenetriamine, dimethylcyclohexylamine, dimethylaminopropylhexahydrotriazine, N,N,N',N',N"-pentamethyldiethylenetriamine, N,N-dimethylcyclohexylamine, and 2,4,6-tris(dimethylaminomethyl)phenol. According to embodiments, the isocyanate-reactive component is storage stable even when both an amine catalyst and an olefin (e.g., hydrohaloolefin) based blowing agent are included.

The catalyst component may include at least one non-amine based catalyst in addition to the at least one amine based catalyst. The non-amine based catalyst may be nitrogen-containing bases, alkali metal hydroxides, alkali phenolates, alkali metal alcoholates, hexahydrothiazines, and/or organometallic compounds. For example, the non-amine based catalyst may be solution of potassium-acetate in diethylene glycol.

According to an exemplary embodiment, a ratio of the total weight percentage of amine based catalyst in the isocyanate-reactive component to a total weight percentage of ethylene oxide in the isocyanate-reactive component (per 100 parts by weight of the isocyanate-reactive component) may be from 0.05 to 10 (e.g., 0.05 to 7.0, 0.10 to 5.0, 0.10 to 3.5, 0.15 to 3, etc.).

Blowing Agent Component

The blowing agent component includes at least one blowing agent, e.g., at least one blowing agent that includes an olefin. For example, the blowing agent component includes at least one hydrohaloolefin based blowing agent. The hydrohaloolefin based blowing agent may be a hydrochlorofluoroolefin based blowing agent.

For example, the hydrohaloolefin based blowing agent may include at least one halooalkene (such as a fluoroalkene or chloroalkene) that includes 3 to 4 carbon atoms and at least one carbon-carbon double bond. Exemplary hydrohaloolefin based blowing agents include trifluoropropenes, tetrafluoropropenes (such as HFO-1234), pentafluoropropenes (such as HFO-1225), chlorotrifloropropenes (such as HFO-1233), chlorodifluoropropenes, chlorotrifluoropropenes, and chlorotetrafluoropropenes. The tetrafluoropropene, pentafluoropropene, and chlorotrifloropropene compounds may have an unsaturated terminal carbon and no more than one F or Cl substituent. The hydrohaloolefin may be 1,3,3,3-tetrafluoropropene (HFO-1234ze); 1,1,3,3-tetrafluoropropene; 1,2,3,3,3-pentafluoropropene (HFO-1225ye), 1,1,1-trifluoropropene; 1,1,1,3,3-pentafluoropropene (HFO-1225zc); 1,1,1,3,3,3-hexafluorobut-2-ene; 1,1,2,3,3-pentafluoropropene (HFO-1225yc); 1,1,1,2,3-pentafluoropropene (HFO-1225yez); 1-chloro-3,3,3-trifluoropropene (HFCO-1233zd); and/or 1,1,1,4,4,4-hexafluorobut-2-ene (including any and all structural isomers, geometric isomers, or stereoisomers thereof).

The blowing agent component (or the isocyanate-reactive composition) may include, in addition to the hydrohaloolefin based below agent, another blowing agent such as water, a hydrocarbon, a fluorocarbon, a chlorocarbon, a fluorochlorocarbon, a halogenated hydrocarbon, an ether, a fluorinated ether, an ester, an aldehyde, a ketone, and/or $CO_2$ generating material.

Additives

The isocyanate-reactive component may include an optional additive component (which in some embodiments may be excluded). The optional additive component, if included, includes at least one optional additive. The optional additive may be one of a curative agent, a chain extender, a filler, a crosslinker, a stabilizer, a surfactant, and/or another additive that modify properties of the resultant polyurethane.

The optional curative agent may include a dimethyl toluene diamine curing agent, quaternary ammonium compounds, phosphonium compounds, sulfonium compounds, tertiary amines, metal hydroxides, and metal alkoxides. The optional chain extender may have two isocyanate-reactive groups per molecule and may have an equivalent weight per isocyanate-reactive group of less than 400. The optional chain extender may be separate from the simple polyol or simple amine that may be part of the polyol component. Exemplary chain extenders include 1,4-butanediol, ethylene glycol, and diethylene glycol. The optional filler may be an inorganic and/or organic filler, a coloring agent, a water-binding agent, a surface-active substance, a plant protection agent, and/or a plasticizer. The optional crosslinker may include at least one crosslinker that has three or more isocyanate-reactive groups per molecule and an equivalent weight per isocyanate-reactive group of less than 400. For example, the crosslinker may include from 3 to 8 (e.g. 3 or 4) primary hydroxyl, primary amine, or secondary amine groups per molecule, and may have an average equivalent weight from 30 to about 300. The crosslinker may be separate from the simple polyol and simple amine that may be part of the polyol component.

Various other additives may be added to adjust characteristics of the resultant polyurethane product (including rigid foam applications, flexible foam applications, and CASE applications), e.g., those known to those skilled in the art may be used. For example, pigments (such as titanium dioxide and/or carbon black), may be used to impart color properties. Pigments may be in the form of solids or the solids may be pre-dispersed in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the protective coating. Dyes and/or pigments (such as titanium dioxide and/or carbon black), may be included in the optional additive component to impart color properties to the polyurethane resin. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane resin.

Isocyanate Component

The isocyanate component includes at least one isocyanate (e.g., at least one of aliphatic, cycloaliphatic, alicyclic, arylaliphatic, aromatic polyisocyanates, and derivatives thereof that include allophanate-modified, biuret-modified, and isocyanate group—NCO terminated prepolymer). Exemplary polyisocyanate compounds include m-phenylene diisocyanate (MDI), toluene diisocyanate (TDI), hexamethylene diisocyanate (HDI), tetramethylene diisocyanate, cyclohexan diisocyanate, hexahydrotoluene diisocyanate, naphthylene diisocyanate, and bis(isocyanatomethyl)cyclohexane. According to exemplary embodiments, the polyisocyanate component includes TDI and/or MDI. For example, the polyisocyanate component may include a polyisocyanate available from The Dow Chemical Company under the trade name PAPI, VORATEC, VORANATE, or ISONATE.

For example, the polyolisocyanate component includes polymeric MDI. For production of rigid polyurethane, the polyisocyanate may be a diphenylmethane-4,4'-diisocyanate, diphenylmethane-2,4'-diisocyanate, polymers or derivatives thereof or a mixture thereof. Use of the storage stable isocyanate-reactive component may reduce the cost and/or time involved in manufacturing rigid polyurethane foams. For example, the heating of a mixture of the first and second polyether polyols for improving processability and/or mechanical mixing of the first and second polyether polyols for improving solubility may be minimized and/or avoided. According to an exemplary embodiment, when the storage stable polyol is used to form a polyurethane product/reaction system, the isocyanate component is mixed with the isocyanate-reactive component without pre-heating the isocyanate-reactive component (the isocyanate-reactive component including the storage stable polyol).

Polyurethane Polymers

The isocyanate-reactive component may be reacted with the isocyanate component that forms the polyurethane polymers (e.g., a final polyurethane product). The gel time for forming the polyurethane product, after the isocyanate-reactive component is mixed with the isocyanate component, is used to determine whether the isocyanate-reactive component is storage stable. In particular, if there is a greater than 10 second (in exemplary embodiments, greater than 6 seconds) change in gel time after storage, it is determined that the isocyanate-reactive component is not storage stable.

The isocyanate-reactive component may be reacted with the isocyanate component at an isocyanate index from 80 to 500 (e.g., 80 to 200, 85 to 150, 85 to 120, 90 to 120, 95 to 110, etc.). The isocyanate index is measured as the equivalents of isocyanate in the reaction mixture for forming the polyurethane resin, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage. For rigid foam applications, according to exemplary embodiments, the isocyanate index may be from 100 to 150.

Polyurethane is useful, e.g., in applications where modulus, abrasion resistance, toughness, and/or retention of properties in various environmental conditions are important as in coating, a film, or a sealant, as well as in a variety of articles including cast articles, injection molded articles, and extruded articles, such as films or sheets for stamping, cutting, molding and/or thermoforming into articles. The resultant polyurethane product may exhibit good combinations of light transmission and clarity, tensile strength, low temperature flexibility, and moisture vapor transition rates.

All parts and percentages herein are by weight, unless otherwise indicated. All descriptions of molecular weight are based on a number average molecular weight, unless otherwise indicated.

EXAMPLES

The following materials are principally used and the properties provided below are approximate:

| | |
|---|---|
| VORANOL ™ IP 625 | A glycerine initiated all ethylene oxide feed polyol having a number average molecular weight of approximately 625 and having an average functionality of approximately 3 (available from The Dow Chemical Company). |
| VORANOL ™ CP 1055 | A glycerine initiated propoxylated polyether polyol having a number average molecular weight of approximately 1000 g/mol and an average nominal functionality of approximately 3 (available from The Dow Chemical Company). |
| VORANOL ™ WK 3140 | A glycerine initiated propylene oxide and ethylene oxide feed polyether polyol, having a number average molecular weight of approximately 1000 g/mol and an average functionality of approximately 3 (available from The Dow Chemical Company). |
| VORANOL ™ RH 360 | A surcrose/glycerine initiated propoxylated polyether polyol having a number average molecular weight of approximately 716 g/mole and an average functionality of approximately 4.6 (available from The Dow Chemical Company). |
| VORANOL ™ RN 482 | A sorbitol initiated propoxylated polyether polyol having a number average molecular weight of approximately 700 g/mole and an average functionality of approximately 6 (available from The Dow Chemical Company). |
| TERCAROL ™ 5903 | A toluenediamine initiated all propylene oxide feed polyol having a nominal hydroxyl number from 420 to 460 mg KOH/g (available from The Dow Chemical Company). |
| TERCAROL ™ 5902 | A toluenediamine initiated propylene oxide and ethylene oxide feed polyol having a nominal hydroxyl number from 340 to 400 mg KOH/g (available from The Dow Chemical Company). |
| SP11-33 | A hybrid polyester-polyether polyol, as discussed in International Publication No. WO 2013/053555, having a number average molecular weight of approximately 460 g/mol and a nominal hydroxyl number of approximately 276 mg KOH/g. |
| Polyester | A high functionality aromatic polyester polyol with ethylene oxide, as discussed in International Publication No. WO 2012/041709 (available from The Dow Chemical Company). |
| StepanPol ® PS-3152 | A phthalic anhydride diethylene glycol polyester polyol, having a nominal hydroxyl number of approximately 315 mg KOH/g and an average functionality of approximately 2 (available from Stepan Company). |
| Glycerine | Glyercine having an average functionality of 3. |
| DEG | Diethylene glycol having an average functionality of 2. |
| Polycat ® 5 | A tertiary amine blowing catalyst believed to be based on pentamethyldiethylenetriamine (available from Air Products). |
| Polycat ® 8 | A tertiary amine catalyst believed to be based on N,N-dimethylcyclohexylamine (available from Air Products). |
| Polycat ® 41 | A trimerization catalyst believed to be based on tris-dimethylaminopropylhexahydrotriazine (available from Air Products). |
| PMDETA | An amine catalyst based on N,N,N',N',N''-pentamethyldiethylenetriamine. |
| DMCHA | An amine catalyst based on N,N-dimethylcyclohexylamine. |
| Dabco ® TMR 30 | An amine trimerization catalyst based on 2,4,6-tris (dimethylaminomethyl) phenol (available from Air Products). |
| Dabco ® K2097 diethylene | A catalyst that is a solution of potassium-acetate in glycol (available from Air Products). |
| Tegostab ® B 8462 | A polysiloxane-ethylene oxide based polyether copolymer silicon surfactant (available from Evonik Industries). |
| Tegostab ® B 84202 copolymer silicon | A polysiloxane-ethylene oxide based polyether surfactant (available from Evonik Industries). |
| Blowing Agent | A blowing agent that includes HCFO-1233zd (available as Solstice ® LBA from Honeywell). |
| PAPI ™ 27 | An isocyanate that includes polymeric MDI and has a NCO content of approximately 31% (available from The Dow Chemical Company). |
| VORATEC ™ SD 100 | An isocyanate that includes polymeric MDI and has a NCO content of approximately 31% (available from The Dow Chemical Company). |

Examples are prepared using the above materials, according to the following approximate formulations and conditions.

The isocyanate-reactive compositions of Examples 1 to 3 are prepared by first mixing the components with a pneumatic stirrer at room temperature (approximately 21±2° C.). In particular, the isocyanate-reactive compositions of Examples 1 to 3 are prepared according to the formulations in Table 1, below. In this regard, Examples 1 and 2 vary EO content by the use of different simple polyols. In this regard, Example 1 has a relatively lower EO content by including the Glycerine, and Example 2 has a relatively higher EO content by including the DEG. Examples 3 further increases EO content by the inclusion of the glycerine initiated all ethylene oxide feed polyol (i.e., VORANOL™ IP 625).

TABLE 1

| | Example 1 | Example 2 | Example 3 |
|---|---|---|---|
| Formulated Isocyanate-Reactive Composition (parts by weight) | | | |
| VORANOL ™ IP 625 | — | — | 10.0 |
| VORANOL ™ RH 360 | 36.5 | 36.5 | 30.0 |
| VORANOL ™ RN 482 | 40.0 | 40.0 | 40.0 |
| SP11-33 | 20.0 | 20.0 | 20.0 |
| Glycerine | 3.5 | — | — |
| DEG | — | 3.5 | — |
| Polycat ® 5 | 3.0 | 3.0 | 3.0 |
| Polycat ® 8 | 0.6 | 0.6 | 0.6 |
| Polycat ® 41 | 1.2 | 1.2 | 1.2 |
| Tegostab ® B-84202 | 4.0 | 4.0 | 4.0 |
| Water | 1.2 | 1.2 | 1.2 |
| Blowing Agent | 34.8 | 33.6 | 33.6 |
| Total EO Content | | | |
| Total EO (wt % of Total Isocyanate-Reactive Composition) | 1.2 | 3.3 | 7.2 |
| Total EO (wt % without the Blowing Agent) | 1.7 | 4.3 | 9.4 |

The EO content is calculated as a weight percentage based on the following:

Example 1

Calculated based on the EO content of Tegostab® B-84202 (1.8 parts by weight based on total weight of Tegostab® B-84202).

Example 2

Calculated based on combined EO content of DEG (2.9 parts by weight based on total weight of DEG) and Tegostab® B-84202 (1.8 parts by weight based on total weight of Tegostab® B-84202).

Example 3

Calculated based on combined EO content of VORANOL™ IP 625 (8.5 parts by weight based on total weight of VORANOL™ IP 625) and Tegostab® B-84202 (1.8 parts by weight based on total weight of Tegostab® B-84202)

Storage stability of Examples 1 to 3 is based on an observed change in gel time, after a specified length of storage time, when 130 parts by weight (approximately 35 grams) of the isocyanate-reactive composition is reacted with 130 parts by weight of an isocyanate component (approximately 35 grams) at room temperature (21±2° C.) and at an isocyanate index of approximately 115, according to a foaming procedure (as discussed below and as known to one of ordinary skill in the art). In particular, Examples 1 to 3 are prepared using 130 parts by weight of PAPI™ 27 as the isocyanate component. Referring to Table 2, below, each of Examples 1 to 3 are observed for changes in gel time (reactivity) using various samples that have been stored over a period of 0 to 49 days at room temperature.

TABLE 2

| | Gel Time (seconds) | | |
|---|---|---|---|
| Day | Example 1 | Example 2 | Example 3 |
| 0 | 33 | 28 | 27 |
| 3 | 29 | 30 | 27 |
| 8 | 29 | 30 | 27 |
| 14 | 34 | 26 | 26 |
| 21 | 37 | 32 | 29 |
| 28 | 36 | 28 | 27 |
| 35 | 38 | 29 | 28 |
| 49 | 42 | 30 | 31 |

Referring to Table 2, above, for the first 35 days relatively good storage stability is realized for each of Examples 1 to 3. Said in another way, over a period of 35 days of storage, a significant change in gel time (reactivity) is not observed for Examples 1 to 3. Further, for the first 49 days exceptional storage stability is realize for both Examples 2 and 3. Accordingly, it can be seen that increased EO content has a favorable impact on the storage stability of an isocyanate-reactive composition that includes each of a polyol component, a catalyst component, and a blowing agent component having a hydrohaloolefin based blowing agent such as a hydrochlorofluoroolefin blowing agent. Further, it can be seen that the added benefit of the higher EO content (e.g., EO content from 3.0 wt % to 8.0 wt %, based on the total weight of the isocyanate-reactive component, or from 4.0 wt % to 10.0 wt %, based on the weight of the isocyanate-reactive component excluding the Blowing Agent) may be realized by either adding additional simple ethylene based polyols or an polyoxyethylene polyol derived from an all ethylene oxide feed (i.e., especially no other alkylene oxides other than ethylene oxide are used in the production of the polyol).

The isocyanate-reactive compositions of Examples 4 to 10 are prepared by first mixing the components with a pneumatic stirrer at room temperature (approximately 21±2° C.). In particular, the isocyanate-reactive compositions of Examples 4 to 10 are prepared according to the formulations in Table 3, below. In this regard, Examples 4 and 5 compare the addition of EO content through different polyester polyols having differing amounts of EO content. Examples 6 and 7 compare the addition of EO content through both an aromatic amine initiated polyether polyol and a polyester polyol. Example 8 illustrates an advantageous instance in which the EO content is derived through all three of an alcohol initiated polyether polyol, an aromatic amine initiated polyether polyol, and a polyester polyol. Examples 9 and 10 compare the addition of EO through only polyether polyols, whereas the amount of at least an aromatic amine initiated polyether polyol is increased instead of using a polyester polyol.

TABLE 3

| | Example 4 | Example 5 | Example 6 | Example 7 | Example 8 | Example 9 | Example 10 |
|---|---|---|---|---|---|---|---|
| Formulated Isocyanate-Reactive Composition (parts by weight) | | | | | | | |
| VORANOL™ CP 1055 | 7.7 | 7.7 | 7.7 | 7.7 | — | — | — |
| VORANOL™ WK 3140 | — | — | — | — | 7.7 | 7.7 | 14 |
| VORANOL™ RN 482 | 25.0 | 25.0 | 25.0 | 25.0 | 25.0 | 25.0 | — |
| TERCAROL™ 5903 | 40.0 | 40.0 | — | — | — | — | — |
| TERCAROL™ 5902 | — | — | 40.0 | 40.0 | 40.0 | 55.0 | 74 |
| Polyester | 15.0 | — | 15.0 | — | — | — | — |
| StepanPol® PS-3152 | — | 15.0 | — | 15.0 | 15.0 | — | — |
| Glycerine | 4.3 | 4.3 | 4.3 | 4.3 | 4.3 | 4.3 | 4.3 |
| PMDETA | 2.1 | 2.1 | 1.5 | 1.5 | 1.3 | 1.2 | 1.0 |
| DMCHA | 1.6 | 1.6 | 1.6 | 1.6 | 1.6 | 1.6 | 1.6 |

TABLE 3-continued

|  | Example 4 | Example 5 | Example 6 | Example 7 | Example 8 | Example 9 | Example 10 |
|---|---|---|---|---|---|---|---|
| Dabco ® TMR 30 | 0.7 | 0.7 | 0.7 | 0.7 | 0.7 | 0.7 | 0.7 |
| Dabco ® K2097 | 0.1 | 0.1 | 0.1 | 0.1 | 0.1 | 0.1 | 0.1 |
| Tegostab ® B 8462 | 3.5 | 3.5 | 3.5 | 3.5 | 3.5 | 3.5 | 3.5 |
| Water | 0.5 | 0.5 | 0.5 | 0.5 | 0.5 | 0.5 | 0.5 |
| Blowing Agent | 30.0 | 30.0 | 30.0 | 30.0 | 30.0 | 30.0 | 30.0 |
| Total EO Content |  |  |  |  |  |  |  |
| Total EO (wt % of Total Isocyanate-Reactive Composition) | 4.8 | 6.1 | 13.7 | 15.0 | 18.6 | 17.2 | 24.4 |
| Total EO (wt % without Blowing Agent) | 6.2 | 7.9 | 17.8 | 19.5 | 24.2 | 22.4 | 31.7 |

The EO content is calculated as a weight percentage based on the following:

Example 4

Calculated based on combined EO content of Polyester (4.6 parts by weight based on total weight of the Polyester) and Tegostab® B 8462 (1.6 parts by weight based on total weight of Tegostab® B 8462).

Example 5

Calculated based on combined EO content of StepanPol® PS-3152 (6.3 parts by weight based on total weight of StepanPol® PS-3152) and Tegostab® B 8462 (1.6 parts by weight based on total weight of Tegostab® B 8462).

Example 6

Calculated based on combined EO content of TERCAROL™ 5902 (11.6 parts by weight based on total weight of TERCAROL™ 5902), Polyester (4.6 parts by weight based on total weight of the Polyester), and Tegostab® B 8462 (1.6 parts by weight based on total weight of Tegostab® B 8462).

Example 7

Calculated based on combined EO content of TERCAROL™ 5902 (11.6 parts by weight based on total weight of TERCAROL™ 5902), StepanPol® PS-3152 (6.3 parts by weight based on total weight of StepanPol® PS-3152), and Tegostab® B 8462 (1.6 parts by weight based on total weight of Tegostab® B 8462).

Example 8

Calculated based on combined EO content of VORANOL™ WK 3140 (4.7 parts by weight based on total weight of VORANOL™ WK 3140), TERCAROL™ 5902 (11.6 parts by weight based on total weight of TERCAROL™ 5902), StepanPol® PS-3152 (6.3 parts by weight based on total weight of StepanPol® PS-3152), and Tegostab® B 8462 (1.6 parts by weight based on total weight of Tegostab® B 8462).

Example 9

Calculated based on combined EO content of VORANOL™ WK 3140 (4.7 parts by weight based on total weight of VORANOL™ WK 3140), TERCAROL™ 5902 (16.0 parts by weight based on total weight of TERCAROL™ 5902), and Tegostab® B 8462 (1.6 parts by weight based on total weight of Tegostab® B 8462).

Example 10

Calculated based on combined EO content of VORANOL™ WK 3140 (8.5 parts by weight based on total weight of VORANOL™ WK 3140), TERCAROL™ 5902 (21.5 parts by weight based on total weight of TERCAROL™ 5902), and Tegostab® B 8462 (1.6 parts by weight based on total weight of Tegostab® B 8462).

Storage stability of Examples 4 to 10 is based on an observed change in gel time when 130 parts by weight (approximately 35 grams) of the isocyanate-reactive blend is reacted with 130 parts by weight of an isocyanate component (approximately 35 grams) at room temperature (21±2° C.), according to a foaming procedure (e.g., as known to one of ordinary skill in the art). In particular, Examples 4 to 10 are prepared using 130 parts by weight of VORATEC™ SD 100 as the isocyanate component. The isocyanate index ranges from 115 to 131. In particular, for Example 4 the isocyanate index is 117, for Example 5 the isocyanate index is 115, for Example 6 the isocyanate index is 124, for Example 7 the isocyanate index is 122, for Example 8 the isocyanate index is 121, for Example 9 the isocyanate index is 120, and for Example 10 the isocyanate index is 131.

Referring to Table 4, below, the isocyanate-reactive compositions of Examples 4 to 10 are evaluated for storage stability, after being stored at 40° C. and at 50° C., over a period of 14 days.

TABLE 4

| | | Gel Time (seconds) | | | | | | |
|---|---|---|---|---|---|---|---|---|
| Temperature | Day | Example 4 | Example 5 | Example 6 | Example 7 | Example 8 | Example 9 | Example 10 |
| 40° C. | 0 | 20 | 23 | 18 | 23 | 20 | 22 | 18 |
| | 7 | 21 | 23 | 17 | 23 | 21 | 22 | 19 |
| | 14 | 22 | 28 | 16 | 22 | 22 | 24 | 20 |

TABLE 4-continued

| | | Gel Time (seconds) | | | | | | |
|---|---|---|---|---|---|---|---|---|
| Temperature | Day | Example 4 | Example 5 | Example 6 | Example 7 | Example 8 | Example 9 | Example 10 |
| 50° C. | 0 | 20 | 23 | 18 | 23 | 20 | 22 | 18 |
| | 7 | 30 | 28 | 18 | 28 | 19 | 25 | 22 |
| | 14 | 35 | 33 | 23 | 30 | 22 | 28 | 28 |

Referring to Table 4, above, Examples 4 to 10 are storage stable for at least 14 days, when stored at 40° C. Further, Examples 5 and 9 are storage stable for at least 14 days, when stored at 50° C. In particular, it is generally seen that at higher EO content good storage stability is realized. Optimized storage stability may be realized at an EO content around 15 wt % to 20 wt %, based on the total weight of the isocyanate-reactive component and/or 23 wt % to 28 wt %, based on the weight of the isocyanate-reactive component excluding the Blowing Agent (but included the water).

In addition, with respect to the source of EO content (from polyols only), referring to Examples 4 and 5 it is seen that improved storage stability, when stored at 50° C., may be realized by using higher EO content polyester polyols, when the EO content with respect to polyols is derived from only polyester polyols. Referring to Examples 6 and 7, it is seen that when the EO content with respect to polyols is derived from both aromatic amine imitated polyols and polyester polyols, using higher EO content polyester polyols has less of an impact on the storage stability when stored at 50° C. Referring to Example 8, it is seen that when the EO content with respect to polyols is derived through all three of an alcohol initiated polyether polyol, an aromatic amine initiated polyether polyol, and a polyester polyol, improved storage stability is realized, when stored at both 40° C. and 50° C. Referring to Examples 9 and 10, it is seen that when the EO content is derived from only polyether polyols (i.e., no polyester polyols are used) storage stability, when storage at 50° C., may be reduced compared to when polyether polyols are combined with polyester polyols (as a source of EO content). Further, it is seen that with increased amounts of the aromatic amine initiated polyether polyol, decreased storage stability, when storage at 50° C., may be realized.

The foaming procedure for evaluating gel time for all of the Examples 1 to 10 includes pouring the isocyanate-reactive component and the isocyanate component, both thermostated at room temperatures (21±2° C.), into the same cup and mixing with a pneumatic stirrer at approximately 3000±50 rpm for 4 seconds (measured based on at the time the timer is started). Reactivity as gel time is measured and qualitative observations on the system behavior and potential foam defects may also be evaluated. Gel time is measured as the time at which the reacting mixture is developed enough that the reaction product sticks to a metal sticker to form strings after the stick is inserted in the reaction product and promptly thereafter withdrawn.

The invention claimed is:

1. A storage stable isocyanate-reactive composition, comprising:
a total ethylene oxide content from 10 wt % to 20 wt %, based on the total weight of an isocyanate-reactive component that includes a polyol component, a catalyst component, and a blowing agent component, wherein:
the polyol component includes at least one polyol, the catalyst component includes at least one amine catalyst, the blowing agent component includes at least one hydrohaloolefin based blowing agent, and the at least one polyol includes from 1 wt % to 20 wt % of a low functionality alcohol initiated polyether polyol that is a diol or triol, from 10 wt % to 30 wt % of a high functionality alcohol initiated polyether polyol having a nominal hydroxyl functionality of 4 or greater, from 20 wt % to 60 wt % of an aromatic amine initiated polyether polyol, based on a total weight of the isocyanate-reactive component; and
the isocyanate-reactive component is storable at room temperature and a higher temperature of 50° C. for a period of at least 10 days with a less than 10 second change in gel time when reacted with an isocyanate component at an isocyanate index from 100 to 150, compared to when the same isocyanate-reactive component is stored for a period of less than 1 day at room temperature and reacted with the same isocyanate component at the same isocyanate index from 100 to 150.

2. The storage stable isocyanate-reactive composition as claimed in claim 1, wherein the at least one hydrohaloolefin based blowing agent is a hydrochlorofluoroolefin based blowing agent and the at least one amine catalyst is a diamine or triamine.

3. The storage stable isocyanate-reactive composition as claimed in claim 1, wherein the at least one hydrohaloolefin based blowing agent is a 1-chloro-3,3,3 trifluoropropene based blowing agent.

4. The storage stable isocyanate-reactive composition as claimed in claim 1, wherein the isocyanate-reactive component is storable at 50° C. for a period of at least 10 days with a less than 6 second change in gel time when reacted with the isocyanate component at the isocyanate index from 100 to 150, compared to when the same isocyanate-reactive component is stored for the period of less than 1 day at room temperature and reacted with the same isocyanate component at the same isocyanate index from 100 to 150.

5. A polyurethane article, comprising the reaction product the storage stable isocyanate-reactive composition as claimed in claim 1 and the isocyanate component.

6. A rigid foam, comprising the reaction product the storage stable isocyanate-reactive composition as claimed in claim 1 and the isocyanate component.

7. An appliance comprising the rigid foam as claimed in claim 6.

8. A method of producing a polyurethane article, comprising:
storing a storage stable isocyanate-reactive component at room temperature and a higher temperature of 50° C. for a period of at least 10 days;
providing an isocyanate component;
providing the storage stable isocyanate-reactive component, after the storing the storage stable isocyanate-reactive component, the storage stable isocyanate-reactive component having a total ethylene oxide content from 10 wt % to 20 wt %, based on the total weight of the isocyanate-reactive component that includes a polyol component, a catalyst component, and a blowing agent component, the polyol component including at least one polyol, the catalyst component including at least one amine catalyst, the blowing agent component including at least one hydrohaloolefin based blowing agent, and the at least one polyol includes from 1 wt % to 20 wt % of a low functionality alcohol initiated polyether polyol that is a diol or triol, from 10 wt % to 30 wt % of a high functionality alcohol initiated polyether polyol having a nominal hydroxyl functionality of 4 or greater, from 20 wt % to 60 wt % of an aromatic amine initiated polyether polyol, based on a total weight of the isocyanate-reactive component; and reacting the isocyanate component with the storage stable isocyanate-reactive component at an isocyanate index from 100 to 150, whereas a less than 10 second change in gel time is realized when reacting the isocyanate component with the storage stable isocyanate-reactive component after the storing the storage stable isocyanate-reactive component, compared to when the same isocyanate-reactive component is stored for a period of less than 1 day at room temperature and reacted with the same isocyanate component at the same isocyanate index from 100 to 150.

9. The storage stable isocyanate-reactive composition as claimed in claim 1, wherein:
the low functionality alcohol initiated polyether polyol has a number average molecular weight of less than 1500 g/mol, and
the high functionality alcohol initiated polyether polyol has a number average molecular weight of less than 1500 g/mol.

10. The storage stable isocyanate-reactive composition as claimed in claim 1, wherein the polyol component further includes from 5 wt % to 30 wt % of a polyester polyol, based on the total weight of the isocyanate-reactive component.

11. The storage stable isocyanate-reactive composition as claimed in claim 10, wherein the at least one hydrohaloolefin based blowing agent includes 1,3,3,3-tetrafluoropropene (HFO-1234ze); 1,1,3,3-tetrafluoropropene; 1,2,3,3,3-pentafluoropropene (HFO-1225ye), 1,1,1-trifluoropropene; 1,1,1,3,3-pentafluoropropene (HFO-1225zc); 1,1,1,3,3,3-hexafluorobut-2-ene; 1,1,2,3,3-pentafluoropropene (HFO-1225yc); 1,1,1,2,3-pentafluoropropene (HFO-1225yez); 1-chloro-3,3,3-trifluoropropene (HFCO-1233zd); or 1,1,1,4,4,4-hexafluorobut-2-ene.

12. The method of producing the polyurethane article as claimed in claim 8, wherein:
the low functionality alcohol initiated polyether polyol has a number average molecular weight of less than 1500 g/mol, and
the high functionality alcohol initiated polyether polyol has a number average molecular weight of less than 1500 g/mol.

13. The method of producing the polyurethane article as claimed in claim 8, wherein the polyol component further includes from 5 wt % to 30 wt % of a polyester polyol, based on the total weight of the isocyanate-reactive component.

14. The method of producing the polyurethane article as claimed in claim 8, wherein the at least one hydrohaloolefin based blowing agent includes 1,3,3,3-tetrafluoropropene (HFO-1234ze); 1,1,3,3-tetrafluoropropene; 1,2,3,3,3 -pentafluoropropene (HFO-1225ye), 1,1,1-trifluoropropene; 1,1,1,3,3-pentafluoropropene (HFO-1225zc); 1,1,1,3,3,3-hexafluorobut-2-ene; 1,1,2,3,3-pentafluoropropene (HFO-1225yc); 1,1,1,2,3-pentafluoropropene (HFO-1225yez); 1-chloro-3,3,3-trifluoropropene (HFCO-1233zd); or 1,1,1,4,4,4-hexafluorobut-2-ene.

* * * * *